Figure 1:
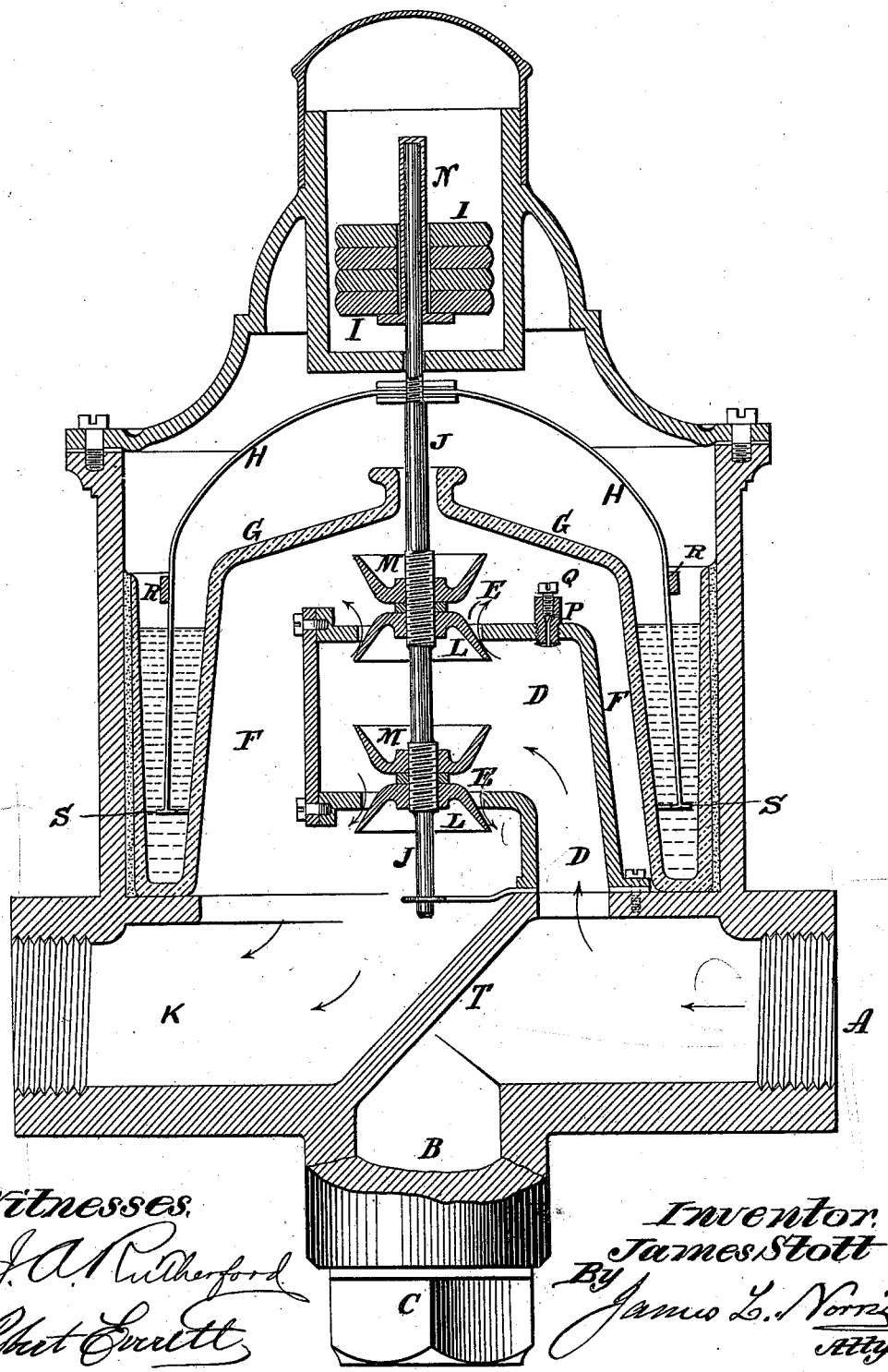

(No Model.)  2 Sheets—Sheet 1.
J. STOTT.
COMBINED GAS REGULATOR AND SAFETY STOP VALVE.

No. 418,543. Patented Dec. 31, 1889.

Witnesses
J. A. Rutherford
Albert Everett

Inventor
James Stott
By James L. Norris
Atty.

(No Model.) 2 Sheets—Sheet 2.
J. STOTT.
COMBINED GAS REGULATOR AND SAFETY STOP VALVE.
No. 418,543. Patented Dec. 31, 1889.
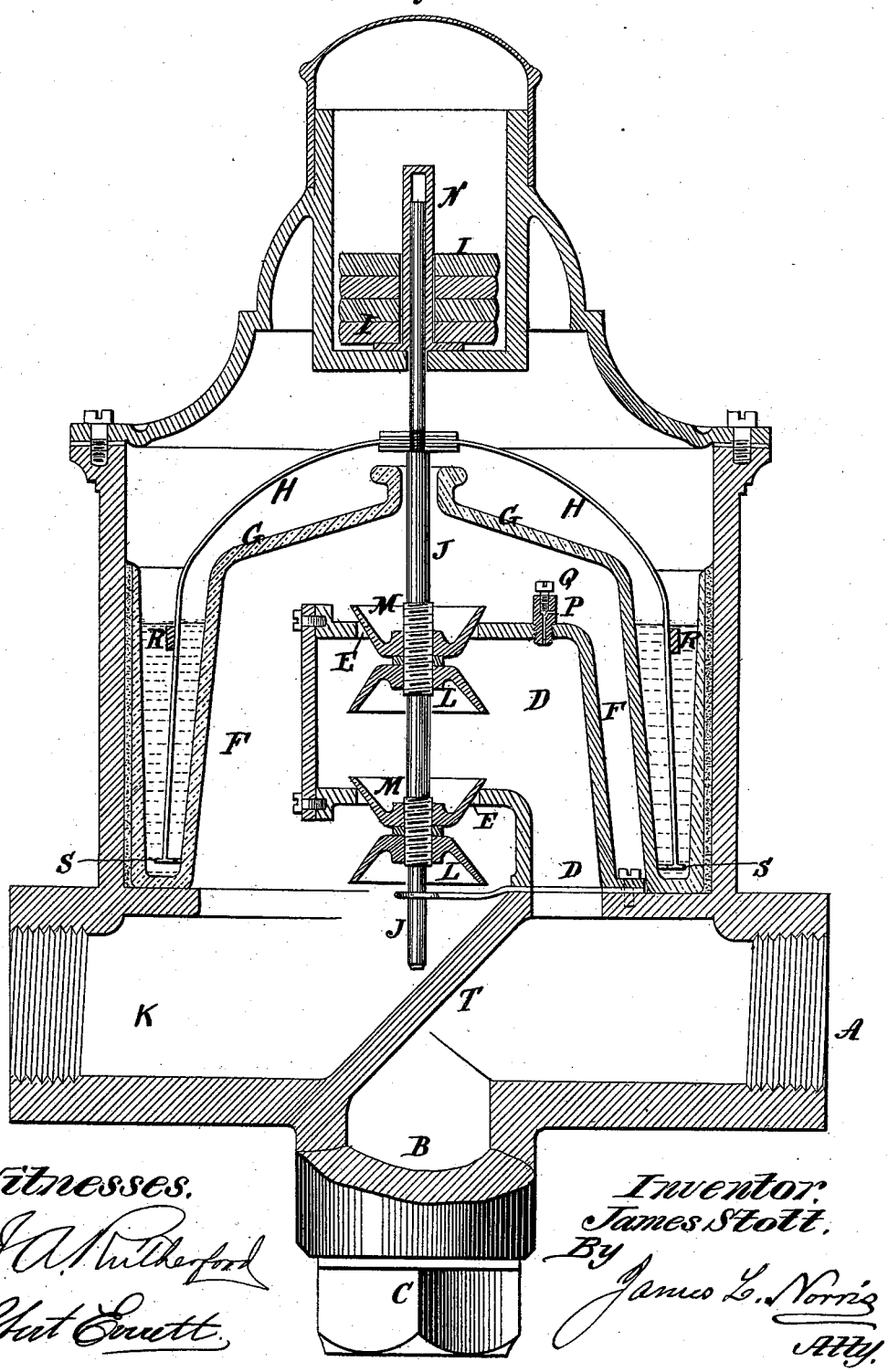

UNITED STATES PATENT OFFICE.

JAMES STOTT, OF LONDON, ENGLAND.

COMBINED GAS-REGULATOR AND SAFETY STOP-VALVE.

SPECIFICATION forming part of Letters Patent No. 418,543, dated December 31, 1889.

Application filed July 5, 1887. Serial No. 243,413. (No model.) Patented in England October 29, 1886, No. 13,905.

*To all whom it may concern:*

Be it known that I, JAMES STOTT, a subject of the Queen of Great Britain, residing at 174 Fleet Street, in the city of London, England, have invented a new and useful Combined Gas-Regulator and Automatic Safety Stop-Valve, (for which I have obtained a patent in Great Britain, No. 13,905, bearing date October 29, 1886,) of which the following is a specification.

My invention relates to gas-regulators, and more particularly to that class having a mercury or liquid trough in which a float dips; and it has for its object to provide means for effecting the better and more efficient operation of such meters.

In the annexed drawings, Figure 1 is a vertical sectional view showing the valves in position when the gas is passing through the apparatus, and Fig. 2 is a similar view showing the stop-valves upon their seats when the supply of gas has been cut off.

A is the inlet-pipe for horizontal feed, and B the inlet-pipe for vertical feed, which is shown with a shut-off plug C, so that gas can enter at A only, which gas passes into the box D, and, passing through the apertures E E and also through the annular space F surrounding it, accumulates in the chamber formed between the shield G and the dome of the float H to raise the float H in the mercury, the height to which the float shall rise being determined by the weights I I upon the spindle J, which weights are increased or decreased according to the maximum number of lights connected with that service, whereby the action of the valves is equilibrated and the flow of gas through the apparatus kept uniform, the gas passing to the burners by the outlet K. This is the operation described with reference to my previous patent, No. 352,072.

My stop-valve mechanism fitted in combination with my regulating appliances is as follows: On the same spindle J that carries the regulating-valve L, I fit stop-valves M M, which, when the supply is turned off or otherwise cut off, drop by their own weight upon their seats of the box, as at Fig. 2, the float H dipping deep into the mercury and not capable of rising until the cap is removed and the spindle lifted by hand to enable the apparatus to again act as a governor, as described in my patent, No. 361,908. As the stop-valves descend, the spindle J is carried down with them, and in this descent the weights I, which are carried by a thimble N, rest on the bottom of the weight-chamber, as indicated at Fig. 2, so that the spindle has a further and independent motion, the weight of the float and of the valves being sufficient to keep the valves M M on their seats.

If a pilot-light is required, I fit the box D with a nipple P and turn the gas sufficiently on at the meter for that purpose, but not to the pressure that would lift the stop-valves M M from their seats, and I provide the nipple P with a screw-pin Q to regulate the quantity of gas passing through the aperture in the nipple, which gas passes to the outlet K to feed a pilot. This supply of gas, which is very minute, can also be utilized for detecting escape of gas from a faulty pipe or otherwise, because if all the burners are turned off and the gas turned on for this small supply and the burner farthest from the apparatus be turned on to be lighted and will not light it will be evident to an attendant that an escape exists somewhere. By this means the pipes can be tested without danger.

I have described the nipple P and screw Q for the pilot-light and testing purposes as attached to the valve-box D; but it may be in the partition T or in a by-pass from A to K. If the gas be turned full on and all the burners are shut off, the gas passing through the nipple P would accumulate in the chamber F, and having a free access to the space under the dome would by its volume and pressure be sufficient to lift the float and the stop-valves from their seats, and as the spindle in rising reaches the top of the thimble N, gas having by this time passed through the orifices of the seatings E, the accumulated gas under this full pressure would bring the valves L L into equilibrium for the apparatus to act as a governor.

R is a belt or excrescence on the float H, which is above the mercury-level when the apparatus acts as a governor, as indicated at Fig. 1; but when the gas is only partly turned off at the meter the pressure and volume of gas passing through the apparatus are reduced, and the float allows the belt to be only partly submerged, so that the stop-valves will not completely close, the reduced supply passing through in the ordinary manner; but if the gas be completely cut off the belt will be completely submerged, as at Fig. 2, and the stop-valves fall on their seats, to be acted upon in the manner before described when the gas is again turned on to its fullest extent, either by lifting the spindle or by the accumulation of gas at the high pressure.

S is a lip or ledge formed at the bottom of the float projecting at right angles therefrom, which retards the upward action and downward action of the float if the gas be turned fully on or fully off suddenly, and it prevents a chattering noise being heard in the apparatus when the gas is turned on suddenly. This lip S, for convenience, is placed at the bottom of the float H and from the inside as well as the outside; but it may be from one side only or at any other part of the float, but submerged, for the purpose described.

I have described my combined regulating-valves and stop-valves as affixed to the same spindle of a mercury-regulator; but they are equally applicable to what is known as a "diaphragm regulator."

I claim as my invention—

1. In combination with a mercurial governor for gas, the belt or excrescence R, fitted on the float H, as and for the purpose described, and substantially as shown.

2. In a gas governor or regulator, the combination of the stop-valves M M on the spindle J, which carry the regulating-valves L L, the nipple P, with adjusting-screw Q, the loosely-fitted thimble N, the belt or excrescence R, and lip or lips S on the float H, all arranged as shown, and acting in the manner and for the purposes described.

In witness whereof I have hereto signed my name in the presence of two subscribing witnesses.

JAMES STOTT.

Witnesses:
W. C. G. RIDGWAY,
*Notary Public,*
ROLAND D. BLOOMFIELD,
*Notary's Clerk,*
*Both of* 19 *Change Alley, London, E. C.*